(12) United States Patent
Ameriks et al.

(10) Patent No.: US 9,633,395 B2
(45) Date of Patent: *Apr. 25, 2017

(54) METHOD OF ADMINISTERING AN INVESTMENT FUND

(71) Applicant: The Vanguard Group, Inc., Valley Forge, PA (US)

(72) Inventors: John Ameriks, Malvern, PA (US); John Buhl, Wayne, PA (US); Edward Delk, New York, NY (US); Kathryn Hyatt, Wayne, PA (US); Ranga Narayanan, Exton, PA (US); Shawn Travis, Wayne, PA (US); Daniel Wallick, Haverford, PA (US)

(73) Assignee: THE VANGUARD GROUP, INC., Valley Forge, PA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/031,815

(22) Filed: Sep. 19, 2013

(65) Prior Publication Data

US 2014/0089229 A1    Mar. 27, 2014

Related U.S. Application Data

(60) Division of application No. 13/470,964, filed on May 14, 2012, now Pat. No. 8,571,963, which is a
(Continued)

(51) Int. Cl.
*G06Q 40/06* (2012.01)
*G06Q 40/00* (2012.01)
*G06Q 40/04* (2012.01)

(52) U.S. Cl.
CPC ............. *G06Q 40/06* (2013.01); *G06Q 40/00* (2013.01); *G06Q 40/04* (2013.01); *G06Q 40/12* (2013.12)

(58) Field of Classification Search
None
See application file for complete search history.

(56) References Cited

U.S. PATENT DOCUMENTS 5,592,379 A    1/1997    Finfrock et al.
5,966,700 A   10/1999    Gould et al.
(Continued)

OTHER PUBLICATIONS

Bauman, Bonnie, "Future-Income Denominated Funds Creating a Buzz", www.ignites.com/articles/print/20060503/future_income_denominated_funds_creating_a_buzz.htm, May 3, 2006, pp. 1-2.
(Continued)

*Primary Examiner* — Robert R Niquette
(74) *Attorney, Agent, or Firm* — Ratnerprestia

(57) ABSTRACT

A method of administering an investment fund using a computer. The method includes the steps of creating shares for sale, providing a managed distribution schedule identifying a number of payments to be provided during each of consecutive periods, providing an investment strategy for investing in assets to provide funds sufficient to meet the managed distribution schedule, issuing a share to an investor in exchange for funds received from the investor, investing the received funds according to the investment strategy, calculating the value of each of the payments to be provided according to the managed distribution schedule in a period to the investor, and providing each of the payments to the investor during the period. Multiple embodiments relate to methods for calculation and sourcing of each payment.

13 Claims, 8 Drawing Sheets

Related U.S. Application Data continuation of application No. 12/208,097, filed on Sep. 10, 2008, now Pat. No. 8,185,464, and a continuation of application No. 12/209,603, filed on Sep. 12, 2008, now Pat. No. 8,180,695, said application No. 12/208,097 is a continuation of application No. 12/105,994, filed on Apr. 18, 2008, now abandoned.

(60) Provisional application No. 60/993,746, filed on Sep. 14, 2007.

(56) References Cited

U.S. PATENT DOCUMENTS

| | | | |
|---|---|---|---|
| 6,275,814 B1 | 8/2001 | Giansante et al. | |
| 6,636,834 B1 | 10/2003 | Schirripa | |
| 6,671,673 B1* | 12/2003 | Baseman | G06Q 10/06 705/7.26 |
| 6,879,964 B2 | 4/2005 | Sauter et al. | |
| 7,469,228 B2 | 12/2008 | Bonissone et al. | |
| 8,180,695 B2 | 5/2012 | Ameriks et al. | |
| 8,185,464 B1 | 5/2012 | Ameriks et al. | |
| 8,571,963 B2 | 10/2013 | Ameriks et al. | |
| 2002/0174046 A1 | 11/2002 | Mistretta | |
| 2003/0083972 A1 | 5/2003 | Williams | |
| 2004/0148202 A1 | 7/2004 | Siefe et al. | |
| 2004/0177022 A1 | 9/2004 | Williams et al. | |
| 2005/0187851 A1* | 8/2005 | Sant | G06Q 40/06 705/36 R |
| 2005/0234821 A1 | 10/2005 | Benham et al. | |
| 2006/0020531 A1* | 1/2006 | Veeneman | G06Q 40/06 705/35 |
| 2006/0089892 A1 | 4/2006 | Sullivan et al. | |
| 2006/0212380 A1 | 9/2006 | Williams et al. | |
| 2008/0091573 A1 | 4/2008 | Shelon et al. | |
| 2008/0288416 A1 | 11/2008 | Arnott et al. | |
| 2009/0043637 A1* | 2/2009 | Eder | G06Q 10/067 705/35 |

OTHER PUBLICATIONS

Bauman, Bonnie, "Russell to Launch Retirement Income Funds", www.ignites.com/articles/print/20060829/russell_launch_retirement_income_funds.htm, Aug. 29, 2006, pp. 1-2.
Defined Asset FDS GVT SECS Inc FD US Treas SER 7 Ladd Zero, Rule 497 Filing, http://www.sec.gov/Archives/edgar/data/781768/0001005477017002416/0001005477-01-002416-0001.txt, Mar. 30, 2001, pp. 1-19, SEC File No. 033-28452.
"DWS Scudder Launches DWS Alternative Asset Allocation Plus; Fund of mutual funds offers retail access to alternative asset classes;", www.businesswire.com, Aug. 6, 2007, pp. 1-3.
Fidelity Income Fund, Rule 485(a) Filing, http://www.sec.gov/Archives/edgar/data/751199/000075119907000008/main.htm, filed May 17, 2007, pp. 1-359, SEC File No. 002-92661.
Halpern, Richard G., "What Counsel Must Know about the U.S. Treasury Bond Structured Settlement Trust—and Why", www.halperngroup.com/Archive/Counsel.htm, last accessed Sep. 22, 2005, pp. 1-3.
Israelsen, Craig L., "Comparing Active vs. Passive Investing at the Portfolio Level", http://www.horsesmouth.com, Oct. 2, 2006, pp. 1-8.
Israelsen, Craig L., "How Market Losses Affect Retirement Portfolios", http://www.horsesmouth.com, May 7, 2007, pp. 1-19.
Israelsen, Craig L., "The Math of Gains and Losses", http://www.horsesmouth.com, Oct. 16, 2006, pp. 1-8.
Israelsen, Craig L., "Proof That Value Almost Always Beats Growth", http://www.horsesmouth.com, Sep. 12, 2005, pp. 1-6.
Israelsen, Craig L., "Reduce Volatility via Diversification and Time", http://www.horsesmouth.com, Jun. 18, 2007, pp. 1-7.
Israelsen, Craig L., "The True Cost of Volatility's Wild Ride", http://www.horsesmouth.com, Aug. 28, 2006, pp. 1-9.
Israelsen, Craig L., "Using Correlations to Construct Indexed Portfolios", http://www.horsesmouth.com, Sep. 17, 2003, pp. 1-4.
John Hancock Funds II and John Hancock Investment Management Services, LLC, Application for an Order Pursuant to Section 6(c) of the Investment Company Act of 1940, as Amended, for Exemptions from Section 19(b) of the Act and Rule 19b-1 Thereunder, filed Aug. 22, 2008, pp. 1-34 SEC File Nos. 812-13567 and 812-13567-01.
Moeller, Bob, "Lifetime annuity or U.S. bonds?", www.weac.org/News/2004-05/nov04/dollars&sense.htm, Nov. 2004, pp. 1-2.
Oppenheimer Target Distribution Fund, Form N-1A Filing, http://www.sec.gov/Archives/edgar/data/1443100/000072888908001021/n1apspsaiptc.htm, filed Aug. 18, 2008, pp. 1-254, SEC File No. 333-153032.
Oppenheimer Target Distribution & Growth Fund, Form N-1A Filing, http://www.sec.gov/Archives/edgar/data/1443096/000072888908001022/n1apspsaiptc.htm, filed Aug. 15, 2008, pp. 1-254, SEC File No. 333-153033.
Russell Investment CO, Rule 485(a) Filing, http://www.sec.gov/Archives/edgar/data/351601/000119312506178640/d485apos.htm, filed Aug. 24, 2006, pp. 1-197, SEC File No. 002-71299.
Russell Investment CO, Rule 485(a) Filing, http://www.sec.gov/Archives/edgar/data/351601/000119312507157996/d485apos.htm, filed Jul. 19, 2007, pp. 1-271, SEC File No. 002-71299.
TIP Prospectus, TIFF Investment Program, Inc., Apr. 29, 2008, pp. 1-40.
International Search Report for International Application No. PCT/US08/76173 mailed Nov. 14, 2008.
Written Opinion of the International Searching Authority for International Application No. PCT/US08/76173 mailed Nov. 14, 2008.
Prospectus—DAF-GSIF U.S. Treasury Series 7, Mar. 30, 2001, pp. 1-19.
Securities Lawyer Deskbook, Rule 3c-4, Aug. 18, 2001.
TIP Prospectus, TIFF Investment Program, Inc., Supplement dated Jun. 28, 2007 to the Prospectus dated Apr. 30, 2007, pp. 1-41.
The Gabelli Convertible and Income Securities Fund Inc., SEC Form N-2 for Common Stock of the Gabelli Convertible and Income Securities Fund Inc., Sep. 24, 2002, Published by Securities and Exchange Commission http://www.sec.gov/Archives/edgar/data/845611/000095017202002061/s42674b.txt.
SEC Modifies Conditions Relating to Section 19(b) Exemptive Order Applications by the Investment Management Practice Group, May 2007, pp. 3-4.
Goldin, Jonty, Examiner's First Report on Australian Patent Application No. 2008298689 dated Feb. 29, 2012, 2 pgs.
Special Report (Tabloid format): Guide to Mutual Funds, Hedge Funds: Calucag, Ernesto B. BusinessWorld (Jul. 28, 2005).
A market microstructure explanation of ex-day abnormal returns Dubofsky, David A. Financial Management 21.4 (Winter 1992): 32.
Russell Investment CO, Rule 485(a) Filing, http://idea.sec.gov/Archives/edgar/data/351601/000119312506245880/d485apos.htm, filed Dec. 8, 2006 pp. 1-197, SEC File No. 002-71299.

* cited by examiner

Vanguard Managed Payout Funds
Section 19 Policies and Procedures - Sample Distribution

Designate and Declare Separate "13th Distribution" to Distribute Long-term Capital Gains
Reallocate From All Distributions to Return of Capital for Tax Reporting Purposes

Assumptions -
No fund share activity - fund distributes $100 per month based on set rate per share
Fund earns $800 net income and realizes $400 LT cap gains for the year (book=tax). Timing of earnings is shown by month below for illustration purposes 500 ← (label)
510 ← (arrow)

| | Jan | Feb | Mar | Apr | May | Jun | Jul | Aug | Sep | Oct | Nov | Dec | Dec - 13th distribution | Fiscal / Calendar Year Total |
|---|---|---|---|---|---|---|---|---|---|---|---|---|---|---|
| Fund Earnings | | | | | | | | | | | | | | |
| Net Income earned by fund | $ - | $ 10 | $ 150 | $ 20 | $ - | $ 150 | $ - | $ 10 | $ 150 | $ 10 | $ - | $ 300 | | $ 800 |
| Realized LT Capital Gain - Note 1 | - | - | - | 200 | - | - | - | 200 | - | - | - | - | | 400 |
| Total 520 | $ - | $ 10 | $ 150 | $ 220 | $ - | $ 150 | $ - | $ 210 | $ 150 | $ 10 | $ - | $ 300 | | $ 1,200 |
| Distributions | | | | | | | | | | | | | | |
| Regular Monthly Distribution | $ (100) | $ (100) | $ (100) | $ (100) | $ (100) | $ (100) | $ (100) | $ (100) | $ (100) | $ (100) | $ (100) | $ (100) | $ - | $ (1,200) |
| 13th Distribution at Year-End from Long-Term Capital Gains (Required to be Reinvested in Additional Fund Shares) | | | | | | | | | | | | | (600) | (600) |
| Total 530 | $ (100) | $ (100) | $ (100) | $ (100) | $ (100) | $ (100) | $ (100) | $ (100) | $ (100) | $ (100) | $ (100) | $ (100) | $ (600) | $ (1,800) |

Estimated Breakdown of Regular Monthly Distributions for Purpose of Rule 19a-1 Notices to Shareholders (based on year-to-date earnings)

| | Jan | Feb | Mar | Apr | May | Jun | Jul | Aug | Sep | Oct | Nov | Dec | Fiscal / Calendar Year Total |
|---|---|---|---|---|---|---|---|---|---|---|---|---|---|
| Net Investment Income | 0% | 5% | 53% | 45% | 36% | 55% | 47% | 43% | 54% | 50% | 45% | 67% | 67% |
| Realized Capital Gains | 0% | 0% | 0% | 0% | 0% | 0% | 0% | 0% | 0% | 0% | 0% | 0% | 0% |
| Return of Capital | 100% | 95% | 47% | 55% | 64% | 45% | 53% | 58% | 46% | 50% | 55% | 33% | 33% |

Estimated Breakdown of 13th Distribution for Purpose of Rule 19a-1 Notices to Shareholders (based on year-to-date long-term gains)

| | Dec - 13th distribution | Fiscal / Calendar Year Total |
|---|---|---|
| Net Investment Income | 0% | 0% |
| Realized Capital Gains | 67% | 67% |
| Return of Capital | 33% | 33% |

May 24, 2006, year-to-date

Vanguard Managed Payout Growth Focus Fund Investor Shares

600

ARTHUR J SMITH
123 MAIN STREET
WEST CHESTER PA 19380-1111

866-734-4530 — Flagship Service

Fund number 1497
Account number 12345678901

| ACCOUNT VALUE | On 12/31/2005 | On 5/31/2006 |
|---|---|---|
| | $ 197,000.00 | $ 190,250.97 |

| Trade date | Transaction | | Dollar amount | Share price | Shares transacted | Total shares owned |
|---|---|---|---|---|---|---|
| | Balance on 12/31/2006 | | | $ 26.44 | | 7450.980 |
| 1/16 | Distribution | .114 | $850.00 | | | 7450.980 |
| 2/16 | Distribution | .114 | 850.00 | | | 7450.980 |
| 3/16 | Distribution | .114 | 850.00 | | | 7450.980 |
| 4/16 | Distribution reinvest | .114 | 850.00 | 25.01 | 33.986 | 7484.966 |
| 4/21 | Purchase | | 1000.00 | 25.50 | 39.216 | 7524.182 |
| 5/16 | Distribution | .114 | 857.76 | | | 7524.182 |
| | Balance on 5/31/2006 | | | $ 25.40 | | 7524.182 |

Fund distributions year-to-date $ 4,257.76
Estimated breakdown of year-to-date
fund distributions*
75% Net investment income $3,193.32
 0  Net realized capital gain 0.00
 25 Return of capital 1,046.44

Purchases year-to-date $1,850.00
Redemptions year-to-date 3,123.44

The current fund distribution was payable on May 17, 2006

*Explanation of estimated fund distributions
Distributions from the Managed Payout Funds may include net investment income, net realized capital gains, and return of capital. The table above shows an estimated breakdown of year-to-date fund distributions by percentage and by dollar amount. The current-month percentage will be the same as the year-to-date percentage. Return of capital represents money that you invested that is paid back to you—it's not the same as "yield" or "income." You should not draw any conclusions about the fund's overall performance from the distribution amounts or from the fund's distribution policy.

Please note that these amounts are estimates and are subject to change. After the end of the year, you'll receive Form 1099-DIV which provides distribution information for use on your federal income tax return.

Vanguard Managed Payout Growth Focus     FUND/ACCOUNT NO.
Fund Investor Shares     1497/12345678901

- Do not alter or photocopy this Invest-By-Mail slip.
- Visit     or call to change your address Arthur J. Smith List each check $ ☐,☐☐☐,☐☐☐.☐☐
Separately     $ ☐,☐☐☐,☐☐☐.☐☐
               $ ☐,☐☐☐,☐☐☐.☐☐
               $ ☐,☐☐☐,☐☐☐.☐☐

Make checks payable to: The Vanguard Group - 0205

Total amount $ ☐,☐☐☐,☐☐☐.☐☐

VANGUARD INDIV INVEST SVCS
PO BOX 13750
PHILADELPHIA PA 19101 - 9897

000001     1 AOP   D1   1   x- x 00407    09895036099    309

METHOD OF ADMINISTERING AN INVESTMENT FUND

CROSS REFERENCE TO RELATED APPLICATIONS

This application is a Divisional of U.S. application Ser. No. 13/470,964,filed May 14, 2012,now U.S. Pat. No. 8,571,963,issued Oct. 29, 2013,which is a Continuation of U.S. application Ser. No. 12/208,097,filed Sep. 10, 2008, now U.S. Pat. No. 8,185,464,issued May 22, 2012,and a Continuation of U.S. application Ser. No. 12/209,603,filed Sep. 12, 2008,now U.S. Pat. No. 8,180,695,issued May 15, 2012,both of which are incorporated herein by reference in their entirety for all purposes, and both of which claim priority from U.S. Provisional Application No. 60/993,746, filed Sep. 14, 2007,and U.S. Non-Provisional application Ser. No. 12/105,944,filed Apr. 18, 2008,the contents of both of which applications are herein incorporated by reference in their entirety.

BACKGROUND OF THE INVENTION

Many investors arrive at retirement with substantial assets accumulated over years of disciplined saving and prudent investing. Often, these investors are concerned about how best to use their assets to meet monthly retirement expenses, while at the same time preserving their assets for heirs, philanthropy, or other purposes. Traditionally, these investors have had three basic options for generating retirement income:

1. A "planned withdrawal program," in which an investor gradually spends a limited portion of assets over a set period, with the remaining assets invested for long-term retirement goals.
2. A "guaranteed income option," in which an investor turns over assets to an insurance company and purchases a fixed immediate annuity that provides guaranteed income for life.
3. A "spend only the income strategy," in which an investor spends only the dividend and interest income generated by his or her retirement portfolio, leaving the principal intact.

SUMMARY OF THE INVENTION

According to one aspect, the present invention includes an embodiment of a method of administering an investment fund. The method includes the steps of creating a plurality of shares in the investment fund for sale, providing a managed distribution schedule identifying a number of payments to be provided during each of a plurality of consecutive periods, providing an investment strategy for investing in assets to provide funds sufficient to meet the managed distribution schedule, issuing at least one share to an investor in exchange for funds received from the investor, investing the received funds according to the investment strategy, calculating the value of each of the payments to be provided according to the managed distribution schedule in a period, and providing each of the payments to the investor during the period.

In one embodiment, a managed distribution schedule includes a formula for calculating a value for each of the payments in the period. The formula specifies that the value of each payment equals 1/nth of a predetermined percentage of a designated value corresponding to one of the plurality of shares. The number, n, equals a number of payments to be made in the period, and the designated value equal a trailing Net Asset Value (NAV).

Another embodiment includes the steps of creating a plurality of shares in the investment fund for sale, providing a managed distribution schedule identifying a number of payments to be provided during each of a plurality of consecutive periods, issuing at least one share to an investor in exchange for funds received from the investor, investing the received funds in assets including cash, securities, derivatives and other investments, and providing payments to the investor in a period according to the managed distribution schedule. The managed distribution schedule includes a formula for calculating a value for each of the payments. The formula specifies that the value for each payment in the period equals 1/nth of a predetermined percentage of a designated value corresponding to one of the plurality of shares. The number, n, equals a number of payments to be made in the period, and the designated value equals a trailing Net Asset Value (NAV).

The managed distribution schedule may include a formula for calculating a value for each of the payments in the period. The payments provided according to the managed distribution schedule are funded from one or more of net income of the assets, accumulated undistributed net profits resulting from a sale of the assets excluding long-term capital gains, and return of capital.

In a further embodiment of the method of making distributions from the investment fund, the method further includes a step of designating a first portion of each of the provided payments as being sourced from the net income and a second portion of each of the provided payments as being sourced from the return of capital after the payments have been provided in the period. An additional distribution corresponding to the period and being funded from the net long-term capital gains and return of capital is also provided.

BRIEF DESCRIPTION OF THE FIGURES

The invention is understood from the following detailed description when read in connection with the following figures:

FIG. 5 illustrates an exemplary worksheet of exemplary earnings, distributions, and sources of such distributions for an embodiment of the investment fund illustrated in FIG. 1, in accordance with an embodiment of the present invention;

FIG. 6 illustrates an exemplary Rule 19a-1 Notice that may be provided by an exemplary embodiment of the fund illustrated in FIG. 1 to its shareholders, in accordance with an embodiment of the present invention;

DETAILED DESCRIPTION OF THE INVENTION

Retirees generally have two basic needs in retirement funds: (1) regular monthly payments to help meet retirement expenses, and (2) the preservation of retirement savings for future use.

Figure 1:
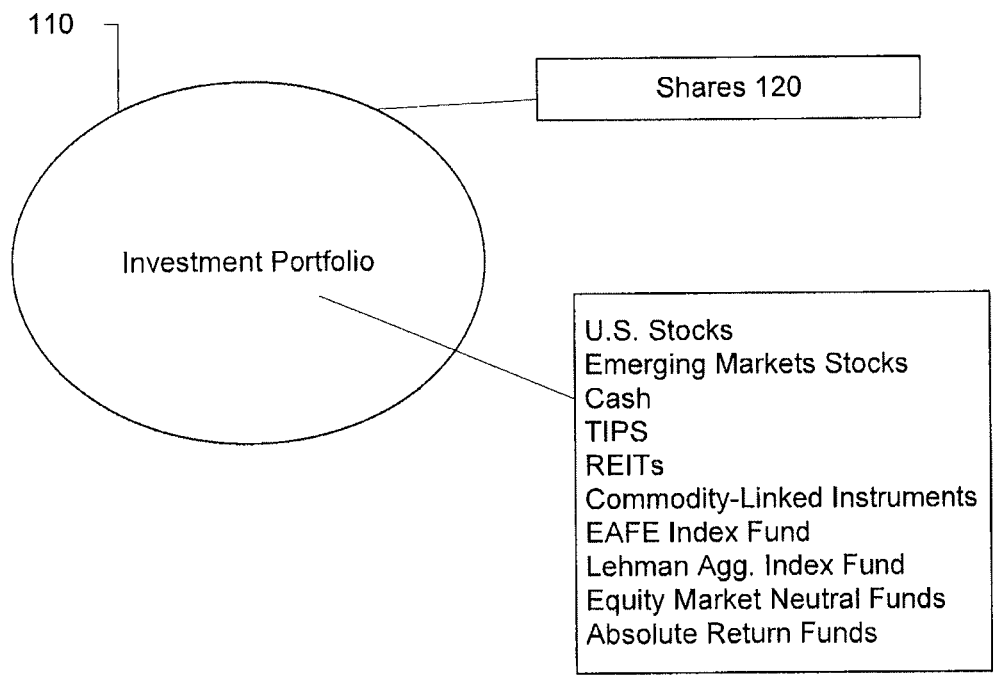
FIG. 1 illustrates an investment fund comprising an investment portfolio, in accordance with an embodiment of the present invention.

Referring now to FIG. 1, there is illustrated an investment fund 100 comprising an investment portfolio 110 and a plurality of shares 120. Portfolio 110 comprises a plurality of securities and other investments (collectively referred to herein as "securities"). The securities may comprise any of stocks (e.g., U.S. stocks or foreign stocks, such as emerging-market stocks), bonds, commodity futures, inflation-indexed securities (e.g., Treasury Inflation Protected Securities ("TIPS")), shares in real estate investment trusts ("REITs"), hybrid securities, currencies, options on securities or securities indexes, futures contracts, options on futures contracts, credit default swaps, total return swaps, forward foreign currency agreements and other derivatives. The securities in portfolio 110 may further comprise shares in one or more funds, such as stock funds, funds that track the Europe, Australasia, and Far East ("EAFE") Index, funds that track the Lehman Aggregate Bond Index, commodities funds, money market funds, equity market neutral funds, absolute return funds, etc. In embodiments of fund 100 where portfolio 110 includes shares in one or more investment funds, fund 100 may be described as a "fund of funds." It is understood that the descriptor, "fund of funds," however, does not exclude fund 100 from owning other types of securities directly. Thus, fund 100 may be characterized as a "fund of funds" even while owning stock, bonds, futures, etc. directly in portfolio 110.

In the embodiment of fund 100 illustrated in FIG. 1, portfolio 110 includes one or more U.S. stocks, one or more emerging market stocks, one or more shares in one or more EAFE Index funds, one or more shares in one or more Lehman Aggregate Bond Index funds, cash, one or more TIPS, one or more shares in one or more REITs, one or more commodity-linked instruments, one or more shares in one or more equity market neutral funds, and one or more shares in one or more absolute return funds. Fund 100 is formed and managed by a fund administrator (not illustrated). As described below, payments to shareholders of shares 120 of fund 100 are provided on a periodic basis according to a managed distribution schedule.

The management of fund 100 and the distribution of payments to the shareholders of shares 120 of fund 100 may implicate important securities law considerations under the Investment Company Act of 1940, as amended. Section 19(a) of the Investment Company Act of 1940, as amended (herein "the Act"), and Rule 19a-1 promulgated thereunder together require investment funds, such as fund 100, to provide shareholders with contemporaneous written statements identifying the source of distributions to shareholders if a portion of the distributions is from a source other than the fund's net income. Section 19(a) of the Act states, in relevant part, that "[i]t shall be unlawful for any registered investment company to pay any dividend, or to make any distribution in the nature of a dividend payment, wholly or partly from any source other than—(1) such company's accumulated undistributed net income, determined in accordance with good accounting practice and not including profits or losses realized upon the sale of securities or other properties; or (2) such company's net income so determined for the current or preceding fiscal year; unless such payment is accompanied by a written statement which adequately discloses the source or sources of such payment."

Rule 19a-1 specifies that every written statement (herein a "Rule 19a-1 Notice") made pursuant to Section 19 by or on behalf of a fund must be made on a separate paper and clearly indicate what portion of the payment per share provided to shareholders is made from the following sources: (1) net income for the current or preceding fiscal year, or accumulated undistributed net income, or both, not including in either case profits or losses from the sale of securities or other properties; (2) accumulated undistributed net profits from the sale of securities or other properties (except that a fund may treat as a separate source its net profits from such sales during its current fiscal year); and (3) paid-in surplus or other capital source, collectively referred to herein as "return of capital." The purpose of the Rule 19a-1 Notice is to afford shareholders adequate disclosure of the sources from which the payments are made so that the shareholders will not believe that a fund's portfolio is generating investment income when, in fact, distributions are paid from other sources, such as shareholder capital or capital gains.

Section 19(b) of the Act and Rule 19b-1 promulgated thereunder together generally prohibit funds from distributing more than one "capital gain dividend" (as defined in Section 852(b)(3)(C) of the Internal Revenue Code (herein the "Code")) with respect to any one taxable year of the fund. Section 852(b)(3)(C) of the Code states, in relevant part, that "a capital gain dividend is any dividend, or part thereof, which is designated by the company as a capital gain dividend in a written notice mailed to its shareholders not later than 60 days after the close of its taxable year . . . ."

Rule 19b-1 has two exceptions. The first exception permits a capital gain dividend "made pursuant to [S]ection 855 of the Code which is supplemental to the prior distribution with respect to the same taxable year of the [fund] and which does not exceed 10% of the aggregate amount distributed for such taxable year." The second exception permits "one additional distribution of long-term capital gains, as defined in the Code, with respect to any one taxable year of the [fund], which distribution is made, in whole or in part, for the purpose of not incurring any tax under [S]ection 4982 of the Code. Such additional distribution may be made prior or subsequent to any distribution otherwise permitted by paragraph (a) of [Rule 19b-1]."

Figure 2:
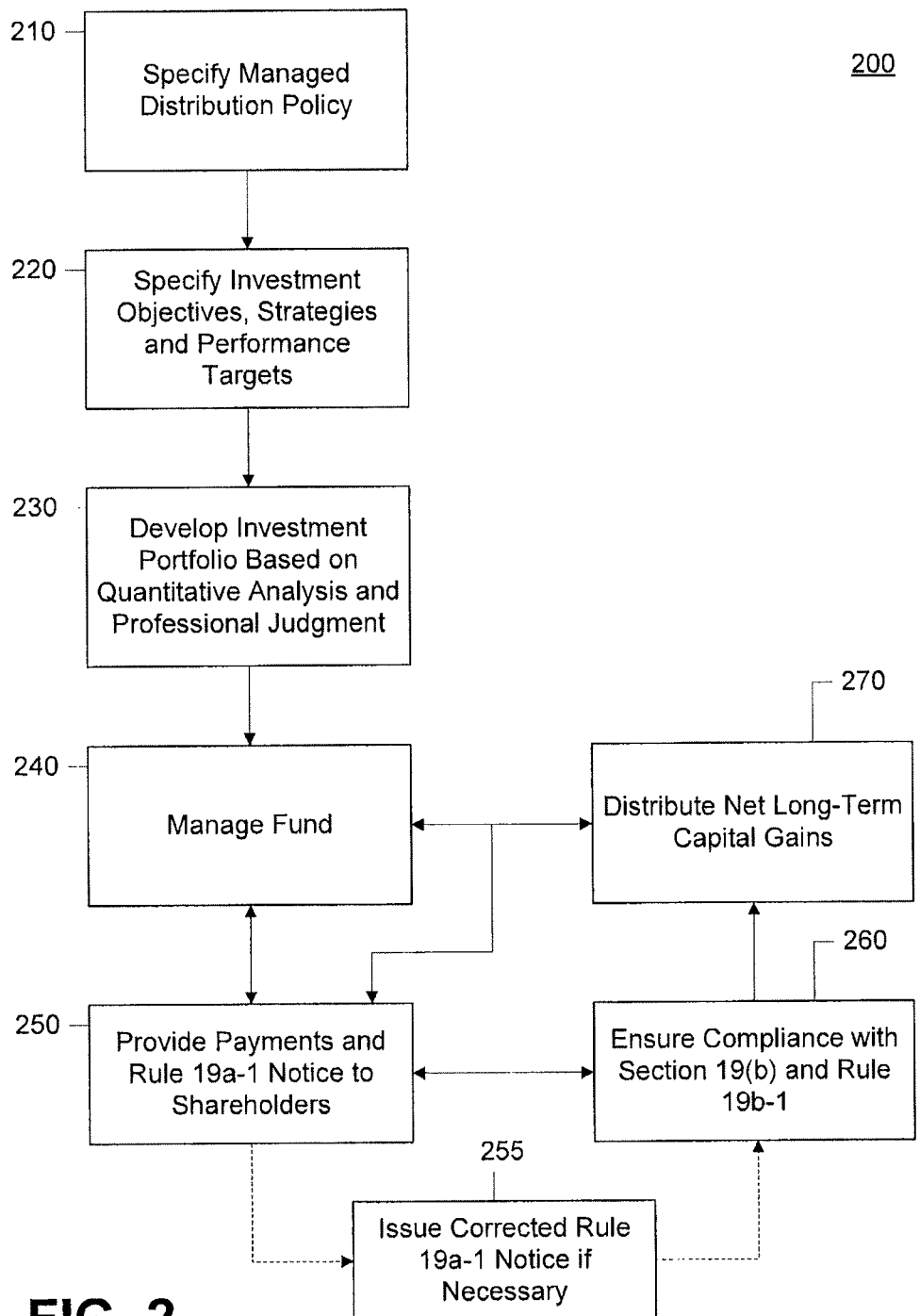
FIG. 2 illustrates a method of constructing and managing the investment fund illustrated in FIG. 1 to be in compliance with Sections 19(a) and (b) of the Investment Company Act of 1940, as amended, and Rules 19a-1 and 19b-1 promulgated thereunder, in accordance with an embodiment of the present invention.

Referring now to FIG. 2, there is illustrated a method 200 of constructing and managing fund 100 in accordance with Sections 19(a) and 19(b) of the Act and Rules 19a-1 and 19b-1 promulgated thereunder, in accordance with an exemplary embodiment of the present invention. Method 200 begins with a step 210 of establishing a managed distribution policy of fund 100 at the inception of fund 100. More specifically, in step 210, fund 100, or more specifically the administrator of fund 100, establishes a managed distribution policy (also called a "payment schedule") to determine how payments of fund 100 are to be calculated, sourced and distributed to shareholders in fund 100 over the life of fund 100. Method 200 continues to a step 220 in which the administrator of fund 100 establishes investment objectives, investment strategies and performance targets for fund 100 to allow fund 100 to achieve its managed distribution policy.

The investment objectives, investment strategies, performance targets, and the managed distribution policy of fund 100 determine how fund 100 is structured and managed. Generally, the administrator chooses the investment objectives, investment strategies, performance targets, and managed distribution policy to allow fund 100 to operate to the extent possible without consuming capital.

Several exemplary embodiments of fund 100 are described herein. In each of the several embodiments of fund 100, the specifics of the investment objectives, investment strategies, performance targets, and managed distribution policies differ as follows:

In a first embodiment of fund 100 (herein "Fund A"), the administrator of fund 100 seeks to generate total returns sufficient to sustain a managed distribution policy while providing inflation protection and capital appreciation over the long term. The managed distribution policy of Fund A is based on an annual distribution rate equal to 3%. Thus, the investment objective of Fund A is to seek to make monthly distributions of cash while providing inflation protection and capital appreciation over the long term, and the investment strategy is tailored to achieve this investment objective.

In a second embodiment of fund 100 (herein "Fund B"), the administrator of fund 100 seeks to generate total returns sufficient to sustain a managed distribution policy while providing inflation protection and capital preservation over the long term. The managed distribution policy of Fund B is based on an annual distribution rate equal to 5%. Thus, the investment objective of Fund B is to seek to make monthly distributions of cash while providing inflation protection and capital preservation over the long term, and the investment strategy is tailored to achieve this investment objective.

In a third embodiment of fund 100 (herein "Fund C"), the administrator of fund 100 seeks to generate total returns sufficient to sustain a managed distribution policy while preserving capital over the long term. The managed distribution policy of Fund C is based on an annual distribution rate equal to 7%. Thus, the investment objective of Fund C is to seek to make monthly distributions of cash while providing capital preservation over the long term, and the investment strategy is tailored to achieve this investment objective.

Although method 200 indicates the flow of the method progressing from step 210 to step 220 (the flow being indicated by the arrow extending from step 210 to step 220), it is contemplated that steps 210 and 220 may be performed in any order. Thus, the administrator of fund 100 may establish a managed distribution policy for fund 100 at its inception in step 210 and then develop investment objectives, investment strategies and performance targets for fund 100 in step 220 to satisfy the managed distribution policy, or the administrator of fund 100 may establish investment objectives, investment strategies and performance targets for fund 100 in step 220 and then develop a managed distribution policy in step 210 to make distributions resulting from the investments of fund 100. Furthermore, although method 200 indicates that the investment objectives, investment strategies and performance targets are developed in one step (step 220), it is contemplated that the investment objectives, investment strategies and performance targets may each be developed in separate sub-steps.

The Managed Distribution Policy of Fund 100

The managed distribution policy of fund 100 generally provides for the periodic distribution of a targeted amount of cash (payments) to be made to shareholders during each of a plurality of consecutive periods based on (1) a distribution rate specified in the managed distribution policy of fund 100 and (2) prior performance of fund 100. The managed distribution policy provides for a number of payments to be provided during each of the consecutive periods and contemplates that the payments are fixed and are of equal amounts in each of the periods, unless there are one or more additional distributions made sometime during a period. As described below, the distributions per share vary from period-to-period based on the prior performance of fund 100.

The managed distribution policy sets forth rules for calculating the payments to be made in each of the consecutive periods for each share 120 of fund 100. More specifically, the managed distribution policy specifies a formula that determines how dollar amounts of the payments are to be calculated in the future based on the distribution rate and the prior performance of fund 100 and how such payments are to be distributed in the future. Due to market volatility, fund 100 does not specify, at the inception of fund 100 or at any time thereafter, dollar amounts to be provided for the payments in the consecutive periods. In other words, fund 100 does not guarantee any amounts of payments to be distributed.

Payments to be provided during each of the consecutive periods in the future are to be calculated during each of the consecutive periods or in a period immediately preceding each of the consecutive periods. In one exemplary embodiment, the calculations during the consecutive periods are to be completed at the beginnings of the consecutive periods.

In an exemplary embodiment of the managed distribution policy, the prior performance of fund 100 is quantified by a trailing net asset value (herein "NAV") of each share 120 in fund 100. The trailing NAV for each share in fund 100 is calculated by averaging the NAV of each share in fund 100 over a predetermined period of time preceding the time of calculation. Because the NAV is calculated for a predetermined period of time preceding the time of calculation, the NAV is referred to as a "trailing NAV."

In this exemplary embodiment, the managed distribution policy provides for the calculation of per-share payments made by fund 100 to be based on the trailing NAV (in addition to the distribution rate). More specifically, the managed distribution policy provides that the amount of each payment to be made in each of the consecutive periods is to be calculated to equal 1/nth of a predetermined percentage of the trailing NAV of each share in fund 100, as represented in the following formula:

$$\text{Distribution per Share} = \text{Predetermined Percentage} \times \text{Trailing NAV}, \quad (1)$$

n where the value "n" is to equal the number of payments to be made in each of the consecutive periods defined by the payment schedule and the "predetermined percentage" is the distribution rate identified in the managed distribution policy. The predetermined percentage (distribution rate) may, for example, be one of 3%, 5%, or 7%, respectively corresponding to embodiments of fund 100 as Fund A, Fund B, and Fund C.

Because the payments of fund 100 are actually calculated in the future, i.e., at some time after the inception of fund 100, and are based on prior performance of fund 100, e.g., the trailing NAV of each share in fund 100, the distributions per share may vary from one of the consecutive periods to another as the performance, e.g., daily NAV, of fund 100 varies over time.

In an exemplary embodiment of fund 100, each of the consecutive periods identified by the managed distribution policy is a fiscal year, and the managed distribution policy identifies that the payments made during each of the fiscal years are to be made monthly. In such an embodiment, the managed distribution policy directs that the monthly distributions per share are to be calculated at the beginning of each fiscal year by averaging a per-share NAV of fund 100 over a prior three-year period of fund 100 in order to increase the relative predictability and relative stability of the distributions of fund 100 to shareholders from year-to-year. A modified version of the formula is to be used until fund 100 has established three years of history. Thus, at the beginning of the first year of fund 100, each of the monthly payments to be provided in the first year is to be calculated using an initial per-share value of fund 100; at the beginning of the second year of fund 100, each of the monthly payments to be provided in the second year is to be calculated using averaged daily per-share NAVs of fund 100 over at least a portion of the first year of fund 100; and at the beginning of the third year of fund 100, each of the monthly payments to be provided in the third year is to be calculated using averaged daily per-share NAVs of fund 100 over at least a portion of the first and second years of fund 100. At the beginning of the fourth year and subsequent years of fund 100, each of the monthly payments to be provided in the fourth and subsequent years is to be calculated using averaged daily per-share NAVs of fund 100 over the three years previous to the year for which the calculations are to be made.

In another exemplary embodiment of fund 100, the distributions per share may be calculated in view of a hypothetical account of a hypothetical shareholder of fund 100 assumed to hold shares in fund 100 purchased at inception. For purposes of the calculation of per-share payments made by fund 100, the hypothetical account is assumed to experience the same distributions as the accounts of actual shareholders of fund 100 and that no further purchases or redemptions are made for the hypothetical account except by way of the automatic reinvestment of any and all additional distributions in additional shares in fund 100. More specifically, in this exemplary embodiment of fund 100, the managed distribution policy provides that the amount of each payment to be made in each of the consecutive periods is to be calculated to equal 1/nth of a predetermined percentage of the average daily value of the hypothetical account over a specified period of time, as represented in the following formula:

$$\text{Distribution per Share} = \frac{\text{Predetermined Percentage}}{n} \times \frac{\text{Average daily account balance of hypothetical shareholder over prior period}}{X}, \quad (2)$$

where the value "n" is to equal the number of payments to be made in each of the consecutive periods defined by the payment schedule, the "predetermined percentage" is the distribution rate identified in the managed distribution policy, and the value "X" is the number of shares in the hypothetical account. The predetermined percentage may be one of 3%, 5%, or 7%, respectively corresponding to embodiments of fund 100 as Fund A, Fund B, and Fund C.

In a variation of the exemplary embodiment described in the previous paragraph, each of the consecutive periods identified by the managed distribution policy is a fiscal year, and the managed distribution policy identifies that the payments made during each of the fiscal years are to be made monthly. In this variation, the managed distribution policy directs that the monthly distributions per share are to be calculated at the beginning of each fiscal year by averaging the value of the hypothetical shareholder account over a prior three-year period of fund 100 in order to increase the relative predictability and relative stability of the distributions of fund 100 to shareholders from year-to-year. A modified version of the formula is to be used until fund 100 has established three fiscal years of history. Thus, in the first fiscal year of the fund, the monthly per-share distribution is based on the initial account balance of the hypothetical shareholder; in the second fiscal year, the average daily account balance of the hypothetical shareholder over the first fiscal year (or the portion of the first fiscal year for which the fund was in existence) is used to determine the monthly distribution per share; and in the third fiscal year, the average daily account balance of the hypothetical shareholder over the first two fiscal years is used to determine the monthly distribution per share. Finally, in the fourth and subsequent fiscal years, the average daily account balance of the hypothetical shareholder over a prior three-fiscal-year time period will be used to determine the monthly distribution per share.

In a variation of the exemplary embodiments of fund 100 discussed above in which the managed distribution policy sets forth monthly payments to be made over a plurality of consecutive fiscal years, the managed distribution policy calls for the distribution of a targeted amount of cash to be provided to the shareholders of fund 100 on or about the 15th calendar day of each month in a calendar year. The monthly distribution per share for fund 100 in a given calendar year is calculated as of January 1 of that year. The managed distribution policy contemplates that the payments to be provided during a calendar year are fixed during that year, unless there are one or more additional distributions with respect to the same calendar year of fund 100, which would be coincident to the calendar year. The monthly distributions per share for any calendar year, however, are still expected to vary from year-to-year based on the performance of fund 100 during prior years.

Finally, it should again be emphasized that the distribution rates (predetermined percentages) of Funds A, B, and C differ and, therefore, their managed distribution policies differ. The managed distribution policies of Funds A, B, and C specify monthly payments that are to be provided during consecutive calendar years. The monthly payments of Fund A are calculated to equal 1/12th of 3% of the trailing NAV of each share in fund 100 at the time of calculation; the monthly payments of Fund B are calculated to equal 1/12th of 5% of the trailing NAV of each share in fund 100 at the time of calculation; and the monthly payments of Fund C are calculated to equal 1/12th of 7% of the trailing NAV of each share in fund 100 at the time of calculation.

Developing an Investment Portfolio and Managing Fund 100

Continuing with the description of method 200, after establishing the managed distribution policies, investment objectives, investment strategies and performance targets in steps 210-220, processing continues to a step 230 in which the administrator of fund 100 develops investment portfolio 110 based on quantitative analysis and professional judgment, and then continues to a step 240 in which the administrator manages fund 100 and particularly portfolio 110.

Generally, in step 230, the administrator of fund 100 (1) identifies eligible asset classes and investments for fund 100, (2) establishes strategic asset allocation ranges specifying minimum and maximum long-term allocations to eligible asset classes and investments of fund 100 and (3) establishes a short-to-intermediate term asset allocation target for fund 100. The administrator's asset allocation target governs the administrator's day-to-day investment decisions for fund 100 made in step 240.

In step 230, to identify eligible asset classes, the administrator uses quantitative analysis and professional judgment in an attempt to combine complementary asset classes across the risk/reward spectrum. The administrator may combine complementary asset classes with historical correlations to one another that are less than a predetermined threshold set by the administrator in order to generate positive long-term total returns through economic and market conditions with a level of risk less than a threshold determined by the administrator. While managing fund 100 in step 240, the administrator need not maintain a fixed asset allocation policy for fund 100 (although the administrator may adopt such a policy), and the exact proportion of each asset class or investment may be changed to reflect shifts in the administrator's risk and return expectations. In other words, while managing fund 100 in step 240, the administrator is not tied to an asset allocation policy developed in step 230. In summary, the administrator's goal for fund 100 is to construct a broadly diversified portfolio that achieves the investment objective of fund 100.

Method 200 continues to a step 250. In step 250, the administrator of fund 100 calculates, in January of each year, the amounts to be distributed by fund 100 pursuant to the managed distribution policy of fund 100 and in accordance with applicable requirements under the Act. Each month prior to the declaration of the monthly distribution of fund 100, the administrator of fund 100 determines the year-to-date net investment income, net short-term realized gains, and net long-term realized gains of fund 100, including adjustments for prior year capital loss carryforwards, if any, and compares these amounts to the previous distributions of fund 100, in order to determine earnings and profits available for distribution. Based upon this information and on the expected magnitude of the planned distribution, the administrator estimates the likely sources of the upcoming distribution for Rule 19a-1 purposes: (1) net income for the current or preceding fiscal year, or accumulated undistributed net income, or both, not including in either case profits or losses from the sale of securities; (2) accumulated undistributed net profits, e.g., short-term capital gains, from the sale of securities; or (3) return of capital. The administrator does not estimate any of the monthly distributions as being from realized long-term capital gains, which will be distributed only at the end of the fiscal year, as described below. The administrator also estimates the cumulative character of the distributions of fund 100 (including the upcoming distributions) based upon the then-current information of fund 100 and will communicate that information to shareholders along with the declared distributions.

In step 250, the administrator arranges for each monthly distribution by fund 100 to be accompanied by a Rule 19a-1 Notice that sets out the sources of the particular distribution, from net income, accumulated realized short-term capital gains or nontaxable return of capital, as well as the sources on an aggregate basis of all distributions to date. Once complete, the administrator provides the Rule 19a-1 Notice and the distributions to the shareholders of fund 100 in step 250. After step 250 is complete, method 200 may return to step 240 in which the administrator may alter the asset allocation strategy of fund 100 using techniques described above.

It is the policy of fund 100 that none of its twelve regularly scheduled monthly distributions (excluding, for the avoidance of doubt, any additional distributions) be sourced from undistributed long-term capital gains. If the estimate by the administrator of the cumulative character (or sources) of the distributions of fund 100 is subsequently ascertained to be inaccurate in a significant amount, in a step 255, fund 100 will correct the estimate through an additional Rule 19a-1 Notice provided to the shareholders of fund 100 or through disclosure in the first shareholder report following discovery of the inaccuracy.

As fund 100 distributes payments to shareholders in step 250 over the course of a fiscal year, the administrator of fund 100 ensures compliance with Section 19(b) and Rule 19b-1 in a step 260 by accumulating all realized long-term capital gains generated by fund 100 during the fiscal year. At the end of the fiscal year, in a step 270, the administrator distributes the accumulated realized net long-term capital gains through a single "capital gain dividend," with the possibility of one or more additional capital gain dividends thereafter with respect to the same fiscal year to the extent permitted by Section 19(b) and Rule 19b-1 and to the extent otherwise required or advisable to ensure compliance with the Act. After step 270 is complete, method 200 may return to step 240 in which the administrator may alter the asset allocation strategy of fund 100 using techniques described above, or method 200 may return to step 250 in which fund 100 distributes further payments to shareholders.

More specifically, in the last month of the fiscal year, in step 260, the administrator of fund 100 calculates and arranges for fund 100 to declare an additional distribution that is sufficiently large to distribute all of the net long-term capital gain, if any, for the entire fiscal year, as well as any other, if any, accumulated but undistributed net income or short term capital gain for the entire fiscal year. The administrator arranges for the relevant portion of the additional distribution to be designated in the annual report of the fund as a capital gain dividend for tax purposes pursuant to Section 852(b)(3)(C) of the Code to the extent of the amount of such net long term capital gain (and assuming the portion of the distribution treated as a dividend for tax purposes is at least equal to such amount). The administrator also arranges for the additional distribution to also include a sufficient amount of return of capital such that each of the distributions of fund 100 for the year (including the additional distribution) are designated as having proportionally the same percentage of nontaxable return of capital. Maintaining the same proportion in the additional distribution as designated in the distributions for the year is desirable in order to ensure that no net long-term capital gain is reallocated for Section 19(b) purposes to any other distribution made during the year. In step 270, the additional distribution is provided to the shareholders of fund 100. It is the policy of fund 100 that 100% of each additional distribution be automatically reinvested in additional shares of the fund, though shareholders who timely request it may instead receive cash that is not automatically reinvested in additional shares.

The administrator may increase the return of capital component of the additional distribution by an amount equal to the sum of (i) the capital losses realized by the fund during the 12th month, (ii) all distributions received during the year that may be subject to retroactive reclassification or deferral after year end, and (iii) an additional amount of return of capital so that the ratio of (i) and (ii) to (iii) matches the ratio of distributed income and/or gain to return of capital for the other twelve distributions and the balance of the additional distribution. This methodology is designed to ensure that the fund fully distributes all net long-term capital gain in the additional distribution, even where the fund in retrospect has more net capital gain as of year-end than was determinable at year-end.

If the administrator determines at a later date that the additional distribution of fund 100 was insufficient to distribute completely all of the net long-term capital gain of fund 100 for the entire calendar year, then the administrator arranges, in step 260, for fund 100, if sufficient undistributed earnings and profits are available for distribution, to declare another additional distribution (a "supplemental distribution") during the subsequent taxable year in order to distribute the balance of its net capital gain. This distribution is made in step 270 in accordance with Rule 19b-1 and is made for the purpose of not incurring any tax under Section 4982 of the Code. It is the policy of fund 100 that 100% of each supplemental distribution be automatically reinvested in additional shares of the fund.

If sufficient undistributed earnings and profits are not available for a fund to make a supplemental distribution, then the administrator arranges, in step 260, for fund 100 to re-designate all or part of the taxable portion of the 12th distribution by fund 100 for the fiscal year as a capital gain dividend in an amount sufficient for fund to be treated as having distributed all of its net capital gain for the entire calendar year. If such re-designation would not be sufficient in amount to cause all remaining net capital gain to be distributed for the entire calendar year, the administrator arranges for fund 100, pursuant to Section 852 of the Code, to retain the undistributed net capital gains, pay the required tax, and file with the Internal Revenue Service appropriate forms to pass-through the capital gains and the tax to the shareholders of fund 100. In that case, the administrator arranges for fund 100 to recalculate on a cumulative basis the sources of its distributions from net income, from realized gains, and from nontaxable returns of capital. The administrator arranges for the final character of such distributions to be reflected in the fund's Form 1099-DIV and included in the annual report of fund 100.

Figure 3:
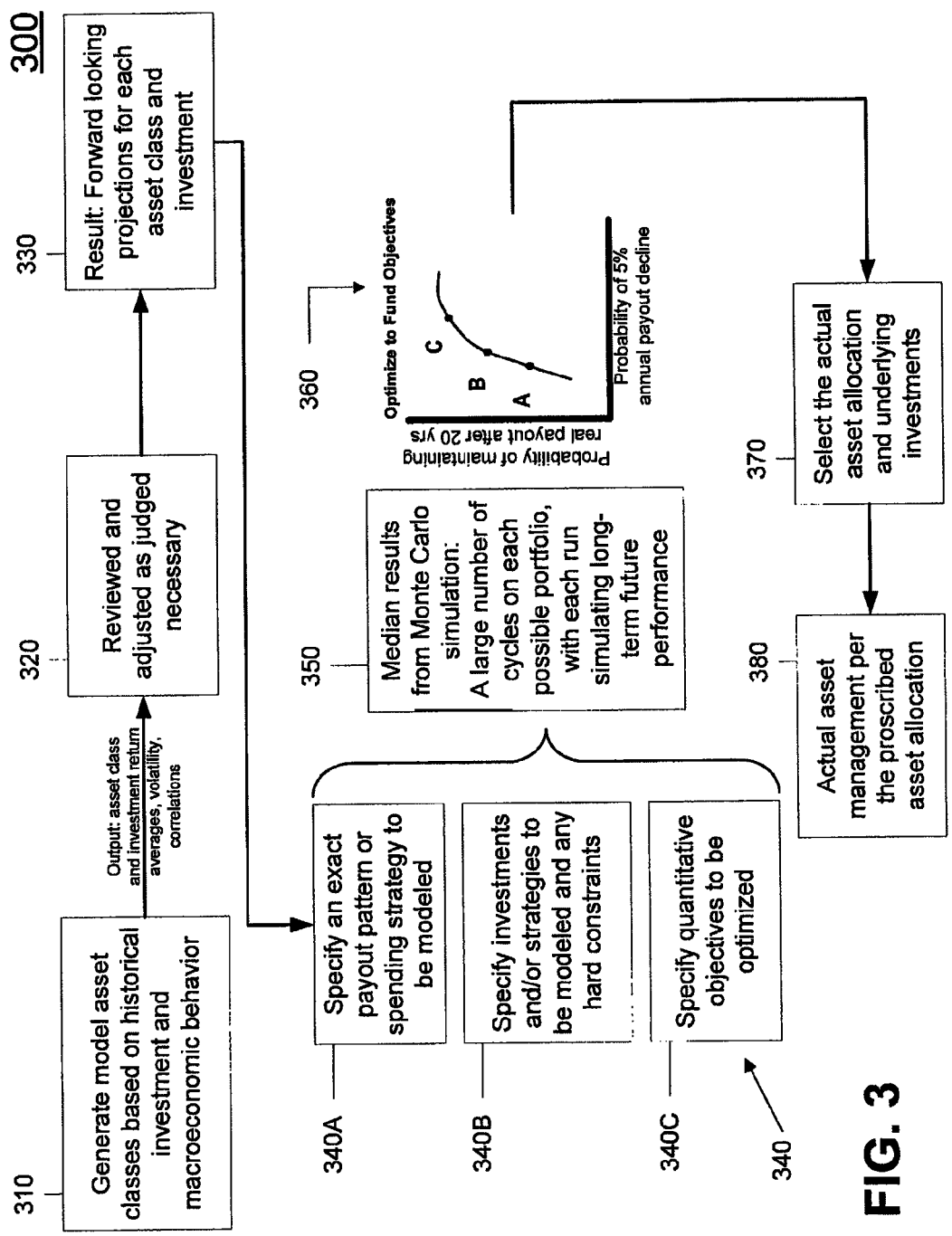
FIG. 3 illustrates a flow diagram of a method of constructing and managing an investment portfolio of the fund illustrated in FIG. 1, in accordance with an embodiment of the present invention.

Referring now to FIG. 3, there is illustrated exemplary method 300 for constructing and managing investment portfolio 110 of fund 100, in accordance with an exemplary embodiment of the present invention. In other words, method 300 illustrates steps 210-240 in more detail.

Generally, to produce an investment portfolio that has a relatively low probability of year-to-year decline and/or a relatively high probability of maintaining real (rather than nominal) distributions, developing an asset allocation strategy involves dynamically allocating assets across a broadly diversified selection of investment opportunities. The administrator uses quantitative analysis and professional judgment in an attempt to combine complementary asset classes and investments across the risk/reward spectrum. The goal is to construct a broadly diversified portfolio that achieves the investment objective of fund 100. The multi-asset investment strategy of fund 100 is more likely to achieve the investment objective of fund 100 than would a conventional fixed allocation among stocks, bonds, and cash. As noted above, fund 100 may choose from any of the following types of assets or investments (or others): stocks, bonds, cash, money market investments, long/short market neutral investments, absolute return investments, commodity-linked investments, inflation-linked investments, and real estate investments. The administrator of fund 100 constructs the asset allocation strategy to determine the proportions of asset classes and investments that reflect the administrator's evaluation of their expected returns and risks as an integrated whole.

As noted above, fund 100 may invest in both traditional assets (such as stocks, bonds, and money market funds) and non-traditional investments (such as absolute return strategies and alternative asset classes, like commodities). The selection and weighting of asset classes and investments is determined by the asset allocation strategy of fund 100 constructed using method 300. It is contemplated that asset allocation strategies are flexible. Initially, fund 100 may obtain equity and fixed income exposure through index funds, generate long/short market neutral returns through specialized funds designed for this purpose and generally characterized as equity market neutral funds, make absolute return investments directly or through various financial arrangements including shares in a specialized fund designed for this purpose, and gain exposure to the returns of a broad-based selection of commodity futures through futures contracts, commodity-linked swap agreements, commodity-linked structured notes or other commodity-linked derivatives. The asset allocation strategy of fund 100 may change over the life of fund 100 to alter these exposures.

Method 300 begins with a step 310 of generating models of asset classes based on historical investment and macroeconomic behavior. More specifically, step 310 provides historical data for asset classes and outputs the data, which data includes asset class and investment return averages, volatility, and correlations between the modeled asset classes and investments. In a step 320, the administrator reviews these outputted data and makes any adjustments as necessary to the models of the asset classes. In a step 330, projections of the modeled assets classes and investments are generated to estimate future performance of the asset classes and investments.

Processing continues to a step 340 in which method 300 receives various inputs from the administrator of fund 100. Step 340 comprises sub-steps 340A, 340B, and 340C. In sub-step 340A, the administrator specifies an exact payout pattern or spending strategy for fund 100. An example of an exact payout pattern or spending strategy is the managed distribution policy discussed above. In an exemplary embodiment, for the limited purpose of selecting candidate investment portfolios, the distributions of fund 100 under its managed distribution policy and each of the candidate investment portfolios are assumed, in sub-step 340A, (1) to be paid in four equal installments at the end of each quarter of each year, and (2) to sum to 5% of the average balance at the end of the most recent twelve quarters, with the initial year's payments totaling 5% of the initial purchase.

In sub-step 340B, the administrator determines candidate portfolios of investments and/or asset allocation strategies to be modeled, as well as any hard constraints on the investment allocations for portfolio 110. The administrator selects viable candidate portfolios based on a consideration of a wide range of strategic inputs, which may include some combination of the following factors (or others): the prior performance of fund 100; value at risk and expected shortfall; volatility; macroeconomic factors; current and expected market conditions; cash flows; estimates of changes in the spreads between the expected returns of eligible asset classes and investments; historical and expected correlations between and among asset classes and investments; quantitative modeling of the likelihood that a proposed combination of assets and investments will achieve the investment objective of fund 100; and the results of stress tests.

Finally, in sub-step 340C, the administrator determines the quantitative objectives to be optimized for candidate portfolios for consideration for selection as portfolio 110 of fund 100. Examples of quantitative objectives that the administrator may specify in sub-step 340C include: median simulated real geometric mean return over 30 years, median simulated real geometric mean growth in simulated distributions over 30 years, median simulated nominal geometric mean growth in simulated distributions over 30 years, median simulated real geometric mean growth in simulated distributions over 30 years, estimated probability of a 5% year-to-year decline in simulated nominal payments, estimated probability of 3 consecutive years of a 5% or more decline in simulated nominal payments over a 30-year history, estimated probability of maintaining nominal value of simulated nominal payments over a set period, and estimated probability of maintaining real value of simulated nominal payments over a set period.

Continuing with the description of method 300, in a step 350, the administrator uses a capital markets simulation model to identify candidates for portfolio 120. Particularly, the model uses the data supplied by the administrator in sub-steps 340A-C and the results provided by step 330 to optimize construction of portfolio 110 across multiple asset classes and investments. In an exemplary embodiment, the capital markets simulation model is a Monte Carlo simulation that runs a large number of cycles on each possible portfolio, with each run simulating long-term future performance. While particular models may be considered superior to others and the overall performance of fund 100 may be highly dependent on the robustness of the model used, the present invention is not limited to or dependent upon the use of any particular model. The results, i.e., the modeled portfolios and asset allocations, of the capital markets simulation model are outputted and plotted in a step 360.

Figure 4:
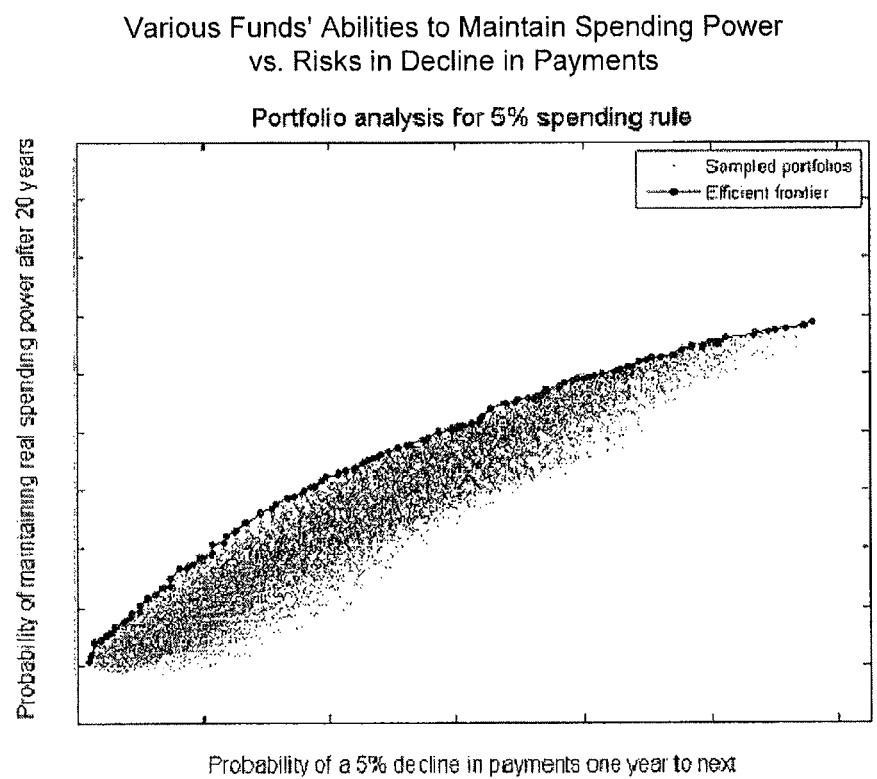
FIG. 4 illustrates an exemplary plot of the probabilities of various investment funds of maintaining real spending power after 20 years versus the probabilities of payments made by such funds declining by 5% from one year to the next, in accordance with an embodiment of the present invention.

Referring now to FIG. 4, there are illustrated the plotted results of the capital markets simulation model provided in step 350 and plotted in step 360. Each portfolio is plotted by its probability of maintaining real spending power after 20 years and its probability of a 5% decline in payments from one year to the next. Optimal portfolios lie along the upper frontier of plot 400, as they have the greatest probability of maintaining real spending power after 20 years given a particular probability of a 5% decline from one year to the next. Although not illustrated, it is also contemplated that plot 400 may plot probability of maintaining nominal spending power after 20 years rather than real spending power.

Continuing again in method 300 illustrated in FIG. 3, after the results of the capital markets simulation model are plotted in step 360, processing continues to a step 370. In step 370, the administrator chooses an investment portfolio from the modeled results plotted by probability of year-to-year decline versus probability of maintaining real distributions greater than a predetermined probability. The administrator therefore selects an investment portfolio from the upper "efficient" frontier of plot 400, from candidate investment portfolios having a relatively low probability of year-to-year decline and/or a relatively high probability of maintaining real distributions. Embodiments in which the administrator considers probabilities of maintaining nominal spending power rather than real spending power are also contemplated.

Finally, in step 380, the advisor seeks to manage fund 100 consistent with a variety of statistical and compliance-based risk management controls and procedures. As the administrator manages fund 100 according to the calculated asset allocation strategy in step 380, the administrator of fund 100 may alter the asset allocation strategy at any time to incorporate additional asset classes or investments into portfolio 110 or to change the weightings of asset classes and investments represented in portfolio 110 in an effort to reduce overall risk or improve risk-adjusted returns consistent with the investment objective of fund 100. The administrator of fund 100 may use the capital markets simulation model described above to generate revised forward-looking asset class and investment performance expectations for optimization of portfolio 110 at any time during the life of fund 100. More specifically, the administrator may model a plurality of additional candidate investment portfolios and choose a reallocated investment portfolio from the modeled results that is expected to have a relatively low probability of year-to-year decline and a relatively high probability of maintaining real or nominal distributions. Thus, the administrator may re-optimize the asset allocation strategy of fund 100, and therefore the asset allocation of portfolio 110 of fund 100, at any time.

The managed distribution policy of fund 100 is not supported by any form of guarantee, line of credit, credit support or any other form of financing intended to guarantee distributions or investment performance to shareholders. Instead, fund 100 makes distributions in accordance with its managed distribution policy, with the result that distributions are likely to vary over time. Accordingly, investors in fund 100 may see their year-to-year distributions grow or decline roughly in tandem with average fund performance over a trailing 3-year period (subject to the terms and conditions of the managed distribution policies). The results of the administrator's investment models, however, indicate that fund 100, and therefore the accounts of the investors in fund 100, are not likely to run out of money over time. Of course, fund 100 may experience losses, in which case the automated payout mechanism may cause investors to consume a corresponding portion of their principal over time. Other embodiments of fund 100 in which fund 100 does guarantee that the managed distributions will be met are contemplated.

As noted above, fund 100 may be embodied as one of Funds A-C. Each of Funds A-C is targeted to appeal to a different set of investors, although some overlap is possible. It should be noted that Funds A-C may attract assets from outside of the retirement channel, given the focus of Funds A-C on regular cash flows and principal preservation.

Fund A is expected to have the greatest appeal to retirement investors who seek only a modest current payout from their assets, but who wish to see their payouts and capital increase over time. Fund A is expected to sustain a managed distribution policy with a 3% annual distribution rate. Compared to the other subject funds, Fund A has a high probability of generating growth in both capital and payouts that exceeds inflation. If successful, Fund A should provide long-term capital appreciation.

Fund B is likely to appeal to retirement investors who want to balance a need for a current payout from their assets with a desire to maintain the purchasing power of their payouts and capital over the long term. Fund B is expected to sustain a managed distribution policy with a 5% annual distribution rate, while providing inflation protection and capital preservation over the long term.

Fund C is likely to appeal to retirement investors who require a greater payout level to satisfy current spending needs. Fund C is expected to sustain a managed distribution policy with a 7% annual distribution rate. Although the payouts and capital of Fund C are not expected to grow at a rate that keeps pace with inflation, Fund C does seek to preserve the "nominal" (or original) value of invested capital over the long term.

Although specific embodiments are described herein comprising Fund A, Fund B, and Fund C, it should be understood that the funds may be offered with any incremental annual distribution rate that has a reasonable probability of providing the targeted returns. Furthermore, although several exemplary embodiments of fund 100 are described above as computing payments based on the average daily account balance of hypothetical shareholder over three calendar years, different time periods may also be used.

Referring now to FIG. 5, there is illustrated a worksheet 500 for exemplary distributions provided by fund 100 for each share in the fund according to method 200. More specifically, worksheet 500 provides a breakdown of sources of earnings and other cash flow of fund 100, monthly distributions of fund 100, and estimated breakdowns of the monthly distributions and an additional distribution for purposes of complying with Section 19(b) of the Act. In an exemplary embodiment, fund 100 generates worksheet 500 in step 260 of method 200 to ensure compliance with the Act. The information provided in worksheet 500 corresponds to a particular, hypothetical calendar year of fund 100.

Portion 510 of worksheet 500 identifies the earnings of fund 100 in each month of the calendar year and the sources of such earnings for each share in fund 100. Portion 510, for example, indicates that fund 100 earns $0 in net income and realized $0 of long-term capital gain in January; $10 of net income and $0 of long-term capital gain in February; $150 of net income and $0 of long-term capital gain in March; $20 of net income and $200 of long-term capital gain in April; etc. As illustrated in exemplary worksheet 500, fund 100 earns $800 of net income in the calendar year and realizes $400 in long-term capital gains over the calendar year.

Portion 520 of worksheet 500 identifies the regular monthly distributions of fund 100 provided over the calendar year. As illustrated, fund 100 distributes $100 per share in each month of the calendar year, per step 250 of method 200, and makes an additional distribution (a 13th distribution) in the amount of $600 sourced in part from long-term capital gains and in part from return of capital, per steps 260 and 270 of method 200. As indicated in worksheet 500, the additional distribution is reinvested in additional shares.

Portion 530 indicates the estimated breakdown of the regular monthly distributions as they were made. More specifically, portion 530 indicates the sources of the regular distributions indicated in portion 520 as such distributions were made. For example, portion 530 indicates that 0% of the January distribution is sourced from net investment income, as fund 100 earns no net income in January (see portion 510), and 0% is sourced from realized long-term capital gains, as fund 100, as a matter of policy, does not source any of the monthly distributions from realized long-term capital gains. Portion 530 indicates that 5% of the total distributions of fund 100, as of the February distribution, is sourced from net income earned by fund 100 and that 95% of the total distributions is sourced from return of capital. In other words, as of the February distribution, $10 of the total $200 distributed is sourced from net income, and the remaining $190 is sourced from return of capital. Portion 530 indicates the breakdown of all of the regular monthly payments based on year-to-date earnings. As can be seen in portion 530, by year end, 67% of all monthly payments are sourced from net income of fund 100, and 33% is sourced from return of capital.

Because fund 100 realized $400 of long-term capital gains over the year (see portion 510), worksheet 500 indicates, in a portion 540, that fund 100 makes an additional distribution in December to distribute all of the long-term capital gains as a capital gains dividend. To ensure that 67% of the additional distribution is sourced from capital gains, so as to maintain the same proportion of return of capital to total distribution in the additional distribution as made over the year in the monthly payments, fund 100 returns $200 of capital in the additional distribution. Thus, 67% of the additional distribution is sourced from long-term capital gains, and 33% is sourced from return of capital. The additional distribution is reinvested in shares of fund 100, and the shares are distributed to the shareholders, unless shareholders timely request receipt of their portion of the additional distribution in cash.

It should be understood that, although method 200 is described in connection with Sections 19(a) and (b) and Rules 19a-1 and 19b-1, the invention is not specific to any particular code or rule, nor is the method necessarily associated with any tax management purpose. Rather, the method sets forth a mechanism for distribution, where possible, of all net long-term capital gains in a special distribution, intended for reinvestment in the portfolio, having the same ratio of nontaxable return of capital as in the previous distributions for the period. It should also be understood that any of the steps referred to herein relating to method 200 may be implemented via a computer. Further, it should be understood that although the distribution method is described herein with reference to a particular fund embodiment, the distribution method may be appropriate for use in connection with any fund embodiment having multiple distributions in a period that would benefit from making all net long-term capital gains in a special distribution, intended for reinvestment in the portfolio, having the same ratio of nontaxable return of capital as in the previous distributions for the period.

Referring now to FIG. 6, there is illustrated an example of a Rule 19a-1 Notice 600 of fund 100. Notice 600 illustrates exemplary January, February, March, April and May distributions of another embodiment of fund 100.

As noted above, in an exemplary embodiment of method 300, the simulation performed in step 350 is a regression-based Monte Carlo simulation. Such an embodiment of method 300 uses the regression-based Monte Carlo simulation to advantage over conventional simulation tools, such as historical time-pathing and basic Monte Carlo simulation.

Historical time-pathing consists of generating future return scenarios based on an asset's historical returns over a chosen time period. Since this historical analysis is restricted to the observed historical sequence outcomes, each scenario simply starts at a different date. A limitation with this approach is that it can exclude extreme-tailed possibilities (rare events never recorded in the historical data sample that could have occurred).

In basic Monte Carlo simulation, return scenarios are drawn from a selected probability distribution of outcomes, rather than replicating chronological segments of historical series. In essence, an asset's simulated return at any point in time will equal its long-term average return plus or minus "noise," the magnitude of which is dictated by the historical volatility of the asset. Although popular among certain investment professionals, basic Monte Carlo techniques have their own limitations. Often, basic Monte Carlo tools assume that asset returns are uncorrelated with the assets' own past returns (i.e., not serially correlated returns) and that correlations with other asset returns in the portfolio are fixed (i.e., fixed cross-correlations among asset returns).

Figure 7:
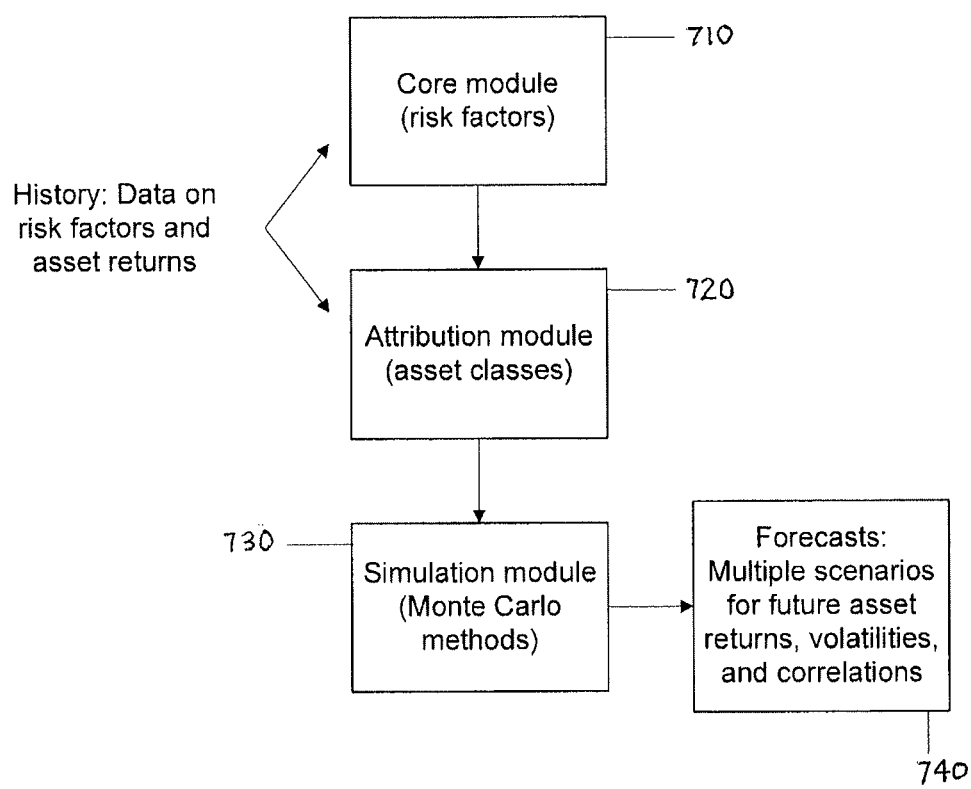
FIG. 7 illustrates a capital markets model employed by the method illustrated in FIG. 3, in accordance with an embodiment of the present invention.

Referring now to FIG. 7, there is illustrated a capital markets model 700, in accordance with an exemplary embodiment of the present invention. Capital markets model 700 is used to perform steps 310, 330, and 350 of method 300.

Capital markets model 700 is based on the theoretical notion that the returns of various asset classes reflect the compensation investors receive for bearing different types of systematic risk (or beta). To reasonably forecast the potential distribution of future asset returns, capital markets model 700 is designed to identify the primary macroeconomic and financial risk factors and how they influence asset returns over time.

Using a long span of monthly financial and economic data, capital markets model 700 estimates a dynamic statistical relationship between risk factors and asset returns. In an exemplary embodiment, capital markets model 700 uses regression-based Monte-Carlo simulation methods to project these relationships in the future.

The return-forecast portion of capital markets model 700 involves three fundamental processes, as illustrated in FIG. 7: (1) a core module 710, (2) an attribution module 720, and (3) a simulation module 730.

Core module 710 implements a dynamic statistical model of global macroeconomic and financial risk factors. Its main function is to generate forecasts of these economic and financial risk factors over different time horizons. In an exemplary embodiment of capital markets model 700, core module 710 implements a vector autoregressive model (VARM). In this embodiment, the VARM measures the interrelationship of the various risk factors with each other. This process begins with the VARM estimating relationships (more specifically, regression "betas") among the system of risk factors based on historical data. The module can then be used to project the estimated relationships into the future over any time horizon. An exemplary time horizon is ten years or longer.

Exemplary risk factors used by core module 710 include the following:

1. Global equity factors: These risk factors are the core drivers of asset prices that are linked to the performance of both domestic and international stock markets.

2. Global fixed income factors: This group of risk factors includes the primary ones that account for all of the stylized characteristics of the global term structure of interest rates or yield curves. The yield curve is considered a leading indicator of economic activity and inflation expectations. International fixed income factors capture differences in long-run inflation expectations between the U.S. bond market and major foreign governments' bond markets, as well as differences in the expected rate of real economic growth and monetary policy. It is important to note that the fixed income factors within core module 510 permit the generation of a complete term structure of U.S. and international government bond yields (ranging from one month to 30 years in duration) for every model simulation at every future point in time.

3. Global economic factors: These risk factors capture current business conditions, inflation shocks, and realized fluctuations in the global business cycle. Global economic and financial conditions are also summarized by commodity markets and foreign exchange markets indicators. For instance, currency risk factors help to explain differences in realized returns between U.S. and unhedged international assets.

A benefit of core module 710 is that it models all of these exemplary global financial and economic risk factors collectively and dynamically using a regression-based framework. Consequently, each of these three risk-factor groups is important to the accuracy of the forecasts of capital markets model 700.

Attribution module 720 relates the global economic and financial risk factors to the returns of various asset classes, including international equities. The main function of attribution module 720 is to "map" the returns of those asset classes to contemporaneous changes in the core global risk factors. This mapping is based on observed historical relationships and is estimated using regression techniques.

For example, attribution module 720 may include the return differential between unhedged international equities and domestic equities. Attribution module 720 captures some of the variability in this return differential based on patterns in certain global equity risk factors, changes in the shapes of the U.S. and international yield curves, and fluctuations in the value of the U.S. dollar, among other factors.

Simulation module 730 constructs scenarios for all risk factors and asset classes represented in modules 710 and 720. Simulation module 730 creates a distribution of future returns, volatilities, and correlations 740. In other words, it simulates a broad range of possible asset-return outcomes (as opposed to a single-point forecast). In this way, simulation module 730 and, therefore, capital markets model 700 account for the volatility of asset return forecasts.

As noted above, in an exemplary embodiment, capital markets model 700 (specifically, simulation module 730) follows a regression-based Monte Carlo simulation method. In a further exemplary embodiment, the vector autoregressive model of core module 710 is combined with a Monte Carlo approach.

As previously discussed, a regression-based Monte Carlo method is an effective way to incorporate statistical uncertainty into forecasts. A sensible approach for dealing with statistical uncertainty is an important piece of any analytical model, since the model needs to provide investors with an adequate framework to assess unanticipated risks. In an exemplary embodiment, for each quarter in the forecast horizon, capital markets model 700 simulates 10,000 scenarios, yielding a complete distribution of potential future paths for the various risk factors and asset returns at various forecast horizons.

Figure 8:
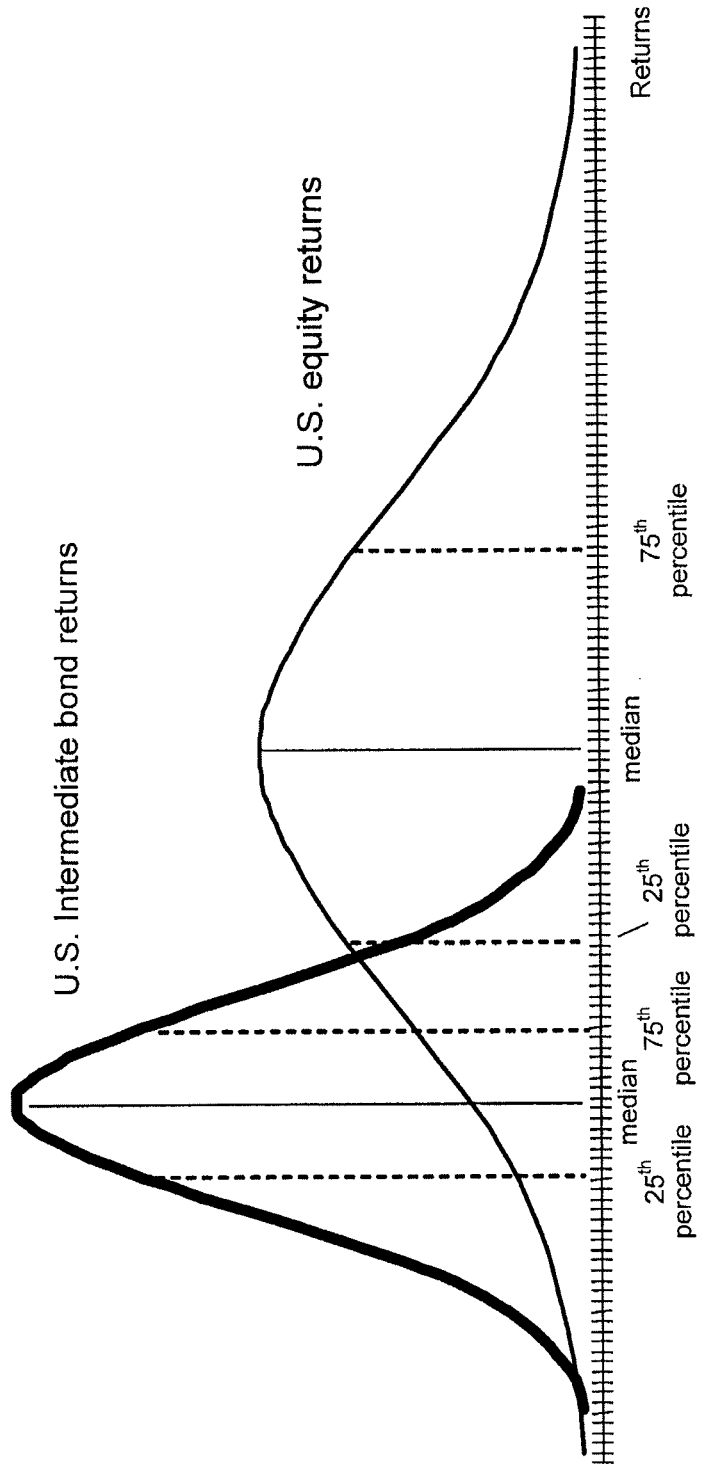
FIG. 8 illustrates exemplary distributions of outcomes generated by simulations of the capital markets model illustrated in FIG. 7 for selected asset classes, in accordance with an exemplary embodiment of the present invention.

FIG. 8 illustrates exemplary distributions of outcomes generated by simulations of capital markets model 700 for selected asset classes (U.S. intermediate-term bonds and U.S. equities), in accordance with an exemplary embodiment of the invention. Although not illustrated in FIG. 8, the outputs of simulations can also be summarized in reports containing key statistical characteristics of the simulated data. An array of summary statistics, including means, medians, and standard deviations, may be tabulated for the various asset-class returns at various forecast horizons.

The execution of model 700 can be divided into two phases. A first phase includes the three modules as previously described: core module 710, attribution module 720, and simulation module 730. The final outcome of this first phase is the distributions of returns and volatilities 740 at the level of each asset class. The second phase consists of combining the asset classes' simulations to create a full set of potential investment portfolios to be considered. Thus, the simulation output from model 700 forms the basis for further analysis and simulations at the portfolio level. Outcomes are combined with exemplary objectives, risk tolerance, and investment horizon of the fund.

It should be understood that some or all of the steps of methods 200 and 300 and some or all of the functionality (modules) of capital markets model 700 may be carried out by or with the assistance of a computer, including but not limited to automated processes for the following: (i) all or any portion of the fund management processes; (ii) issuing, buying, and selling of shares and underlying securities; (iii) receiving and transmitting transfers to and from financial institutions for the purchase or shares or the distribution of periodic payments to shareholders; (iv) calculating the amount of periodic distributions; (v) computerized accounting; (vi) computerized receipt and storage of shareholder data; (vii) computerized reporting to shareholders; and (viii) other computerized or automated functions comprised within the management, distribution, servicing, and other activities in connection with fund 100 and model 700. It should also be understood that the programming techniques necessary to automate such steps and modules by computer are well known in the art.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A computer system for simulating a plurality of potential asset allocation strategies, for selecting an investment strategy from the plurality of potential asset allocation strategies, and for administering an investment fund having a plurality of shares, a managed distribution schedule comprising a plurality of consecutive annual periods and a number of payments to be provided during each of the consecutive annual periods, and an investment strategy for investing in assets to provide funds sufficient to meet the managed distribution schedule, the computer system comprising:

a computer processor, the computer processor specially programmed with instructions for performing method steps comprising: modeling the plurality of asset allocation strategies by defining a capital markets model, said capital markets model comprising:

a core module comprising a dynamic statistical model of global macroeconomic and financial risk factors, including global equity factors, global fixed income factors, and global economic factors, and adapted to generate forecasts of such risk factors over a selected time horizon;

an attribution module configured to map returns of selected asset classes to contemporaneous changes in said risk factors based on observed historical relationships and estimated using regression techniques;

a simulation module configured to construct scenarios for said risk factors and said selected asset classes to create a distribution of future returns, volatilities and correlations;

using the capital markets model to perform thousands of regression-based Monte Carlo simulations to model distributions of returns and volatilities for a plurality of asset classes;

combining the plurality of simulations for the plurality of asset classes to create a set of potential investment portfolios, each potential investment portfolio corresponding to one of the plurality of potential asset allocation strategies;

generating a visual output comprising a digital image of an efficient frontier of the potential asset allocation strategies plotted by probability of year-to-year decline and probability of maintaining real or nominal distributions;

receiving as an input via a user interface a selected asset allocation strategy corresponding to one of the potential asset allocation strategies plotted along the efficient frontier;

calculating annually the value of each of the payments to be provided according to the managed distribution schedule in a selected annual period;

recording issuance of at least one share to an investor in exchange for funds received from the investor;

investing the received funds according to the selected asset allocation strategy, thereby creating an investment portfolio;

providing each of the payments to the investor during the selected annual period, each of the payments in the selected annual period being funded from one or more sources selected from the group consisting of: net income of the assets of the investment portfolio, accumulated undistributed net profits resulting from a sale of any asset of the investment portfolio excluding long-term capital gains, and return of capital;

calculating an estimated contribution from each of the one or more sources to the payment for each of the payments in the selected annual period;

designating, after all the payments in the selected annual period have been provided, a first portion of the payments as sourced from the net income and accumulated undistributed net profits resulting from a sale of any asset of the investment portfolio excluding long-term capital gains and a second portion of the payments as sourced from the return of capital, the second portion corresponding to a percentage of the payments;

providing, to the extent the investment fund has realized net long-term capital gains for the selected annual period, an additional distribution corresponding to the selected annual period, the additional distribution funded in part from the net long-term capital gains and, in part, from return of capital, where the part sourced from return of capital corresponds to a percentage of the additional distribution, and the percentage of the additional distribution sourced from the return of capital is equal to the percentage of the payments in the annual period sourced from the return of capital, after taking all payments into account;

periodically updating the modeling of the plurality of asset allocation strategies using updated historical results of the plurality of asset classes and investments represented in the investment portfolio and a plurality of asset classes and investments not represented in the investment portfolio;

generating an updated digital image comprising an updated efficient frontier of the potential asset allocation strategies plotted by probability of year-to-year decline and probability of maintaining real or nominal distributions;

receiving via the user interface selection of an updated asset allocation strategy; and reinvesting or rebalancing the investment portfolio according to the updated asset allocation strategy.

2. The computer system of claim 1, wherein the programmed instructions further comprise instructions for:

calculating, for each of the payments in the selected annual period, the estimated contribution from each of the one or more sources to accumulated aggregated payments for the selected annual period, and reporting to the investor the estimated contribution from each of the one or more sources to the accumulated aggregated payments.

3. The computer system of claim 1, wherein the programmed instructions further comprise instructions for making the distribution, in part or in whole, as a capital gain dividend.

4. The computer system of claim 1, wherein the programmed instructions further comprise instructions for making the additional distribution to include an amount equal to the sum of the absolute values of (1) all capital losses realized in at least a portion of the selected annual period, (2) any other amount that may be recharacterized as long-term capital gains realized by the fund in the selected annual period, and (3) an appropriate additional return of capital.

5. The computer system of claim 1, wherein each annual period of the payment schedule comprises twelve monthly payments, the programmed instructions further comprising instructions for making the additional distribution in a twelfth month of a selected annual period in the managed distribution schedule or thereafter.

6. The computer system of claim 1, wherein the programmed instructions further comprise a step for reinvesting the annual distribution back into the fund.

7. The computer system of claim 1, wherein the managed distribution schedule comprises a formula for calculating a value for each of the payments; and the value comprises $1/n^{th}$ of a predetermined percentage of a designated value corresponding to one of the plurality of shares, wherein n equals a number of payments and the designated value for at least one of the consecutive annual periods comprises a trailing Net Asset Value (NAV); and the programmed instructions further comprise instructions for performing method steps comprising:

calculating the trailing NAV by averaging NAV over a predetermined amount of time.

8. The computer system of claim 7, wherein each of the periods comprises a year and n =12.

9. The computer system of claim 7, wherein:

for a first year of the investment fund, the designated value comprises an initial per-share value, and for a second year and subsequent years of the investment fund, the designated value comprises a trailing NAV calculated using an averaged daily per-share NAV over at least a portion of years of the investment fund prior to the second or subsequent years.

10. The computer system of claim 9, wherein for a third year of the investment fund, the designated value comprises an averaged daily per-share NAV over at least a portion of the first and second years of the investment fund.

11. The computer system of claim 9, wherein for a fourth year or subsequent years of the investment fund, the designated value comprises an averaged daily per-share NAV over at least a portion of three years of the investment fund previous to the fourth or subsequent years.

12. The computer system of claim 1, wherein the computer processor is programmed with instructions to generate the visual output of the efficient frontier plotted by probability of year-to-year 5% decline and probability of maintaining real or nominal spending power after 20 years.

13. The computer system of claim 1, wherein the computer processor is programmed with instructions to run 10,000 regression-based Monte Carlo simulations for each quarter in a forecast horizon.

* * * * *